Patented Sept. 9, 1952

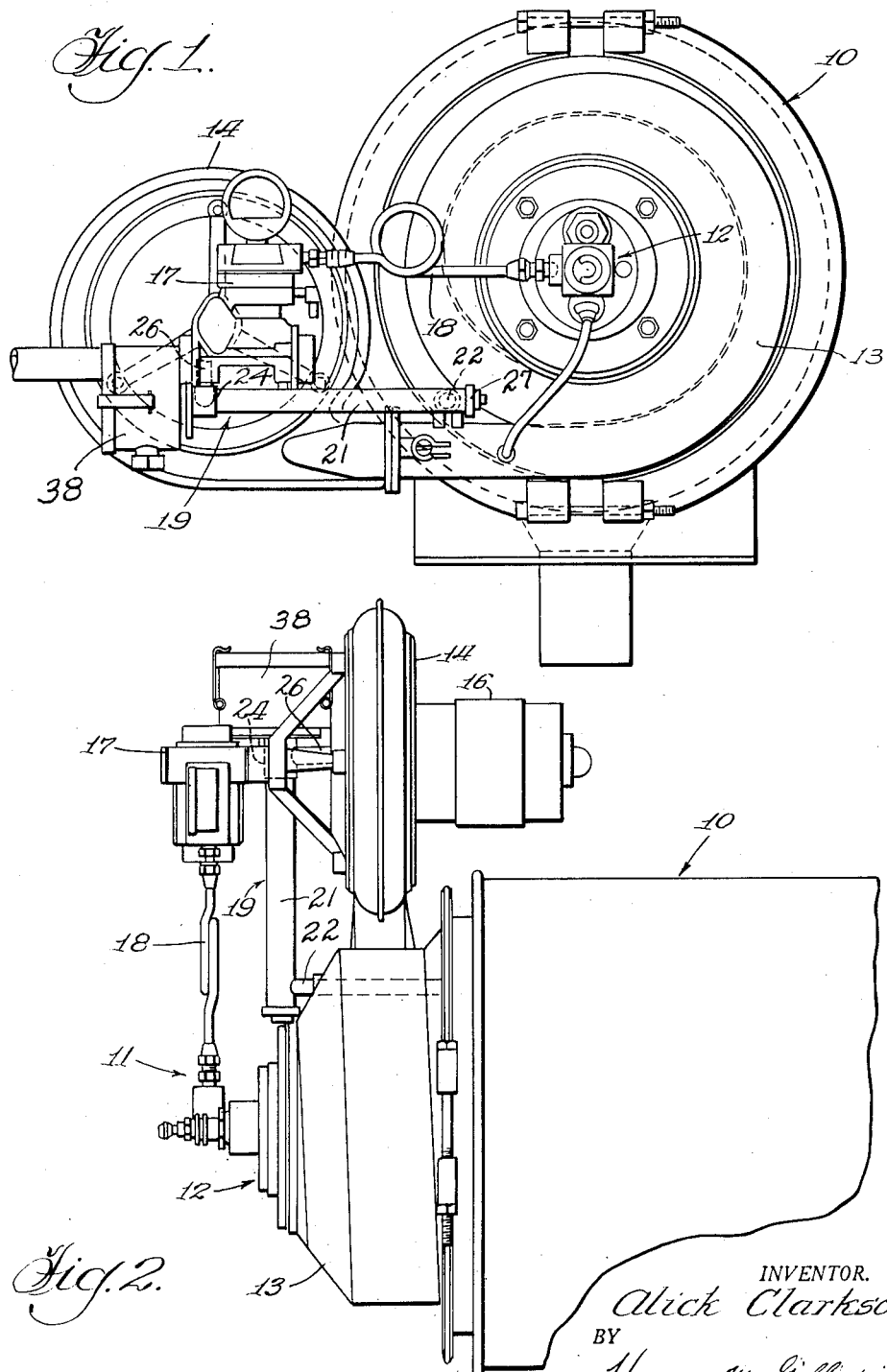

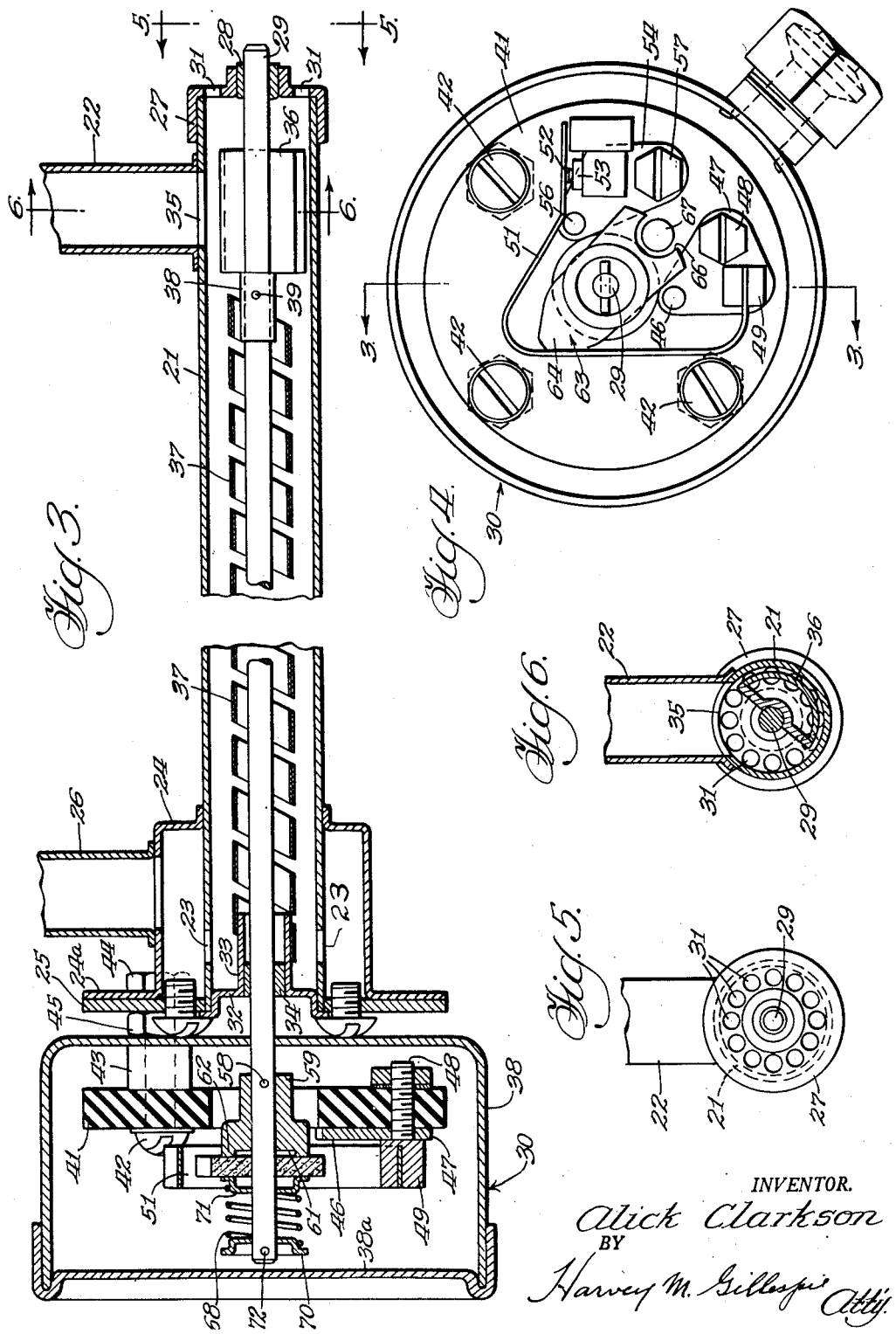

2,609,867

UNITED STATES PATENT OFFICE 2,609,867

THERMOSTATIC SAFETY CONTROL FOR BURNERS

Alick Clarkson, Itasca, Ill., assignor of one-half to Vapor Heating Corporation, Chicago, Ill., a corporation of Delaware Original application April 28, 1948, Serial No. 23,728. Divided and this application February 10, 1950, Serial No. 143,529

5 Claims. (Cl. 158—28)

This invention relates to an improved automatic safety control for heat generators and more particularly to an automatic control for shutting off the blower and/or fuel supply in the event of the fire becoming fortuitously extinguished and not immediately reestablished.

This application is a division of my co-pending application Serial No. 23,728, filed April 28, 1948.

One of the objects of my invention is the provision of a safety control of high sensitivity which is immediately responsive to temperature variations directly within the combustion chamber of a heat generator to insure prompt stoppage of the flow of fuel in the event of accidental extinguishment of the fire.

The important function of the structure of the present invention is to shut off the delivery of fuel and combustion air to the combustion chamber of a gas or oil fired heat generator in the event that the flame is extinguished fortuitously and not immediately re-established. In order to provide high sensitivity and thereby insure prompt stoppage of the delivery of fuel, the invention includes the provision of means whereby a thermostat is subjected to heat directly from the combustion chamber. However, a thermostat suitable for this job and sufficiently sensitive to afford quick action is apt to be damaged if subjected to a peak combustion chamber temperature. It is therefore an important object of the present invention to provide certain improved arrangements whereby a highly sensitive thermostat may be used in a control mechanism adapted to respond to a maximum volume of hot gases directly from the combustion chamber, so as to provide immediate responses to temperature conditions within the combustion chamber, but is protected from the destructive effects of high temperatures.

According to the present invention a conduit connection leads from the combustion chamber of a heat generator to a suction device, preferably the suction side of a blower utilized to deliver combustion air to the combustion chamber. The blower, therefore, in addition to delivering combustion air to the combustion chamber withdraws a small volume of hot gases therefrom. These hot gases are intermixed with a quantity of air, at room temperatures, and the gaseous mixture, so reduced in temperature, is passed into contact with a thermostat which is housed within said conduit. The volume of hot gases withdrawn from the combustion chamber is proportionately reduced as the temperature of the fire chamber increases, but the volume of cool air mixed with the hot gases remains substantially constant. The above result is obtained by means of a valve which is operatively connected with the thermostat so as to be moved into a position to progressively obstruct the admission of hot gases into the thermostat chamber as the temperature of these gases increase.

Other and further objects and advantages of my invention will become apparent from the following description when considered in connection with the accompanying drawings in which:

Fig. 1 is a front elevational view of a horizontal boiler and associated oil burner unit, and illustrating my invention applied thereto.

Fig. 2 is a fragmentary plan view of the structure illustrated in Fig. 1.

Fig. 3 is a longitudinal cross-sectional view of a structure in accordance with my invention, taken on line 3—3 of Fig. 4.

Fig. 4 is a view of one end of the structure showing the thermostatically actuated switch mechanism.

Fig. 5 is a view of the other end of the structure looking in the direction of the arrows 5—5 of Fig. 3.

Fig. 6 is a cross-sectional view taken on line 6—6 of Fig. 3.

Referring to the drawings, my invention is shown by way of illustration as applied to a water heater utilizing oil as a fuel. It will be understood, however, that my invention is capable of application to other types of heat generators employing liquid or gaseous fuels as a heating media. The heat generating unit illustrated comprises a boiler, indicated generally by the numeral 10, the said boiler being of any suitable construction and having a combustion chamber, and a burner unit indicated generally at 11, the said unit including a nozzle assembly 12, a spiral conduit 13, a blower 14 driven by an electrical motor 16 for delivering air into the combustion chamber through said conduit 13, and a fuel pump 17 driven by the same motor, the said fuel pump being connected to the nozzle assembly 12 by a conduit 18.

The control means constituting my invention is indicated generally by the numeral 19 and is shown in Figs. 1 and 2 in relation to the other components of the heat generating unit and is illustrated in detail in Figs. 3 to 6, inclusive. The said control means includes a tubular housing 21 to which is connected, at one end thereof, an intake tube 22 which opens into the combustion chamber of the boiler 10 through which the hot gases are withdrawn from the combustion chamber. The opposite end of tubular housing 21 is provided with openings 23 which lead into a manifold 24 to which is connected a pipe 26 leading to the intake side of the blower 14. The blower 14, in addition to supplying combustion air to the combustion chamber, causes a continuous stream of hot gases of combustion to flow through the housing 21 whenever the fire is going. If for any reason the fire becomes extinguished while the blower 14 is in operation, the temperature of the gases passing through the housing 21 will immediately drop, and conversely, should the fire become reestablished, the temperature of the gases passing through the housing will immediately rise.

Mounted on one end of the tubular housing 21 is a cap 27 arranged to support a bushing 28 in which is journaled a shaft 29. The cap 27 is provided with a plurality of perforations 31 through which a substantially constant volume of air from the surrounding space may be admitted into the interior of the housing 21. Received in the opposite end of the housing 21 is a flanged member 32 having an integral elongated tubular body portion 33 concentric with the wall of the housing 21. The said tubular portion 33 supports a bushing 34 which serves as a journal for the opposite end of the shaft 29. The manifold is provided with a flange 24a against which is abutted a mounting plate 25, the said flange and plate having registering perforations to receive screws for mounting a switch 30, hereinafter to be described. As seen in Fig. 3, the shaft 29 projects to the left, beyond the housing 31 and is operatively connected to the mechanism of switch 30, as will be hereinafter described.

Mounted on the shaft 29 for rotation therewith and disposed in alignment with the intake opening 35 of housing 21 is a semi-cylindrical damper valve 36. The curvature of the damper 36 is concentric with the wall of the housing 21 and is spaced therefrom so as to provide a substantial clearance between the outer surface of the damper 36 and the inner surface of the tubular housing 21. Hence, even though the damper 36 is in fully closed position, a reduced volume of hot gases may be drawn through the intake opening 35 into the housing 21. In Fig. 6 the damper 36 is shown in its fully opened position, and as will be apparent by reference to this figure, counterclockwise rotation of the damper 36 progressively reduces the volume of hot gases and that movement thereof through an angle of approximately 90 degrees will bring it to its fully closed position.

A thermostat element 37 comprising a bimetallic ribbon in the form of an elongated helix is arranged concentric to the shaft 29 and is fixedly secured at one end to the tubular portion 33 and at the other end to a sleeve-like extension 38 of the damper 36. The damper 36 is fixed to the shaft 29 through the medium of a pin 39 which extends diametrically through registering openings in the damper and shaft. Thus, the damper 36 and shaft 29 are caused to rotate as a unit when actuated by the thermostat 37 which operates, in a well known manner, to produce a torsional or twisting movement in response to temperature changes. This twisting movement imparts corresponding rotational movement to shaft 29 and damper 36.

One of the functions of shaft 29 is to operate the mechanism of a switch 30 for controlling (through suitable relays not shown) the circuit of motor 16 which drives the blower 14 and fuel pump 17, the object being to automatically stop the operation of the blower and fuel pump whenever the fire in the heating unit may be extinguished fortuitously, and to hold the motor circuit closed so long as the fire is on. The switch 30 referred to is illustrated in Figs. 3 and 4 and includes a metal housing 38 and a removable cover 38a. The switch 30 comprises a circular panel 14 formed of insulating material and supported by bolts 42 which pass through apertures in the panel 41 and through the back wall of the housing 38. The said bolts pass through spacers 43 and through apertures in the plate 25 and flange 24a and are secured by means of nuts 44 and 45. Pivotally supported on a pin 46 carried on the panel 41 is a metal plate 47 which may be locked in a position of adjustment by a bolt 48 passing through an arcuate slot provided in the panel 41. A metal block 49 which may be integral with plate 47 is slotted to receive and secure therein one end of the contact spring 51 which carriers at its free end a contact 52 adapted to engage a fixed contact 53. The said contact is mounted on a metal plate 54 which is pivotally supported on a pin 56, the said plate being locked in a position of adjustment by a bolt 57 which passes through an arcuate slot in the panel 41. Thus, by reason of the pivotal supports of the plates 47 and 54, relative adjustment between the contacts 52 and 53 may be effected.

Mounted on shaft 29 and fixed thereto, as with a pin 58, is a collar 59. The collar 59 has a centrally recessed portion 61 to provide an annular face 52. Mounted on shaft 29, but not fixed thereon, is a cam indicated generally by numeral 63, the said cam being provided with a rounded nose portion 64 and being notched on its rearward end, as at 66, to accommodate therein a stop pin 67, and stop pin being anchored in the panel 41. It will be apparent that the presence of the pin 67 in the notch 66 limits rotational movement of the pin 63, in either direction, to a very small angle. Cam 63 is maintained in frictional abutment with the annular face 62 of the sleeve 59 by a spring 68 which is interposed between a pair of dished metal discs 70 and 71 bearing against the side face of the cam 63 and a retaining pin 72 respectively, the said pin being driven through shaft 29. It will be evident that the mechanism herein described operates as a frictional clutch to impart rotation of the shaft 29 to the cam 63, this rotation continuing until the cam 63 is moved into engagement with stop pin 67.

The operation of my control means will now be described. When no fire is on and the thermostat element 37 is subjected to the ambient temperature of the atmosphere, damper 36 is in its fully opened position, substantially as shown in Fig. 6. However, almost instantaneously upon the introduction of fire in the combustion chamber of the heat generating unit, a blast of hot gases is drawn into the housing 21, and the thermostat element 37 will respond to the change in temperature and will effect rotation of shaft 29 to move the damper 36 in a counterclockwise direction, as viewed in Fig. 6, toward its closed position. As the damper 36 moves toward its closed position, it progressively restricts the intake opening 35, thereby correspondingly reducing the volume of hot gases being admitted into the housing 21. During the movement of hot gases through the housing 21, cooling air in substantially constant volume is drawn from the ambient space through the apertures 31 and intermixes with the hot gases of combustion to lower the temperature thereof within the housing 21. As the temperature of the gases of combustion increases, the damper 36 will move progressively farther in a direction to close the intake opening 35 to proportionately restrict the admission of hot gases into the housing 21, thus tending to maintain a constant, but desirable low temperature within the housing 21, so as not to subject the thermostat element 37 to excessively high or damaging temperatures, as long as the fire keeps going.

The arrangement above described permits the use of a highly sensitive thermostat, and not only insures against injury to the thermostat element, but also affords almost immediate response to temperature changes, as to both starting and extinguishing of the fire. Upon starting of the fire, the thermostat 37 is subjected at once to a full blast of heat because the damper 36 is in its open position and the intake opening 35 is completely unrestricted. When the fire is extinguished from some reason, the thermostat 37 is quickly effective to rotate the shaft 29 to actuate the swtich to open the motor control circuit and thereby to stop the motor driving the blower and fuel pump. This is accomplished because the thermostat 37 is then subjected to a relatively cooler stream of air that is drawn into the housing 21 through apertures 31.

As will be apparent by reference to Fig. 3, when the shaft 29 is caused to rotate, in one direction or another, as hereinbefore described, the cam 63 will move correspondingly with the shaft. However, its movement is limited by the pin 67 which permits the cam 63 to move just a few degrees in either direction. Thus, even though the shaft 29 continues moving, the cam remains stationary after it contacts the stop pin 67. When the cam is rotated in a counterclockwise direction, as seen in Fig. 4, it deflects spring 51 in a direction to bring about the disengagement of contacts 52 and 53, and when rotated a few degrees in a clockwise direction from the open contact position, the contacts 52 and 53 are urged into engagement, as in the position shown in Fig. 4. It will be seen that a very small angular displacement of cam 63, in either direction is effective to make or break contact, depending upon the direction of rotation of the cam 63. As a result of this construction a small increase in temperature within the housing 21 will effect a contact operation of one kind, while a similarly small decrease in temperature will effect a contact operation of the opposite kind, irrespective of how high the temperature within the combustion chamber may be when the change begins to take place. It will be evident therefore, that even though the shaft 29 may have rotated 80 degrees or more, incidental to damper 36, from its fully opened to fully closed position, nevertheless, a very slight rotation of shaft 29 in the opposite direction will rotate the cam 63 sufficiently to actuate the switch contacts 52 and 53. Similarly, a very slight rotation of shaft 29 in the opposite direction will effect an actuation of switch contacts 52 and 53 of the opposite character.

In the particular case illustrated, contacts 52 and 53 are caused to open relative to each other in response to a decrease in temperature in the housing 21. It will be understood however that other control circuit arrangements may be adopted in which, for example, contacts 52 and 53 are caused to open in response to a temperature increase. Since the invention is not concerned with the motor control circuit, the circuit is not shown in the drawings and is not here considered.

Manifestly there are numerous possible modifications and alternatives within the scope of the inventive concept herein disclosed, and accordingly, the invention is not to be limited otherwise than as indicated by the terms of the appended claims.

I claim:

1. An automatic outfire control device comprising a conduit having a lateral intake port near one end and adapted to be connected with the combustion chamber of a furnace, the other end of said conduit being adapted to be connected to the intake side of a blower, whereby hot gases may be withdrawn from such furnace into said conduit, a bimetallic thermo-responsive elongate helical element disposed within said conduit and co-axial therewith, one end of said element being fixedly anchored against rotation relatively to said conduit, a shaft extending axially through said element and connected to the other end thereof for rotation therewith, a damper carried by said shaft and having a curved surface arranged concentric with the inner surface of said conduit for movement across said intake port to variably constrict the same as the temperature of said thermo-responsive element increases, said curved surface of the damper being of smaller radius than that of the bore of said conduit so that when the damper is in fully closed posture it is still slightly open, thus insuring that some hot gas will flow through said conduit even when the damper is closed, and an air-intake port leading into said conduit for admitting air from the ambient atmosphere, said air-intake port being located adjacent the unanchored end of said thermo-responsive element so that the air entering the conduit therethrough traverses said element to prevent overheating thereof.

2. An automatic outfire control device comprising a conduit having an intake port adjacent one end adapted to be connected with the combustion chamber of a furnace, the other end of said conduit being adapted to be connected to the intake side of a blower, whereby hot gases may be withdrawn from such furnace into said conduit, a bi-metallic thermo-responsive elongated helical element disposed within said conduit and co-axial therewith, one end of said element being fixedly anchored against rotation relatively to said conduit, a shaft extending axially through said element and operatively connected with the other end thereof so as to be rotatable thereby, an electric switch operatively connected with said shaft, a damper carried by said shaft and rotatable therewith, said damper being disposed within said conduit and adjacent said intake port and operative upon rotation to variably constrict said port, the arrangement being such that said damper increasingly constricts said port as the temperature of said element increases, said damper being spaced away from said port so that the port remains slightly open when the damper is in its fully closed posture, and an air-intake port leading into said conduit for admitting air from the ambient atmosphere, said air-intake port being located adjacent the unanchored end of the thermo-responsive element so that the air entering the conduit therethrough traverses said element to reduce the heating effect of said hot gases thereon.

3. An automatic outfire control device comprising a conduit having an intake port adjacent one end adapted to be connected with the combustion chamber of a furnace, the other end of said conduit being adapted to be connected to the intake of a blower, whereby hot gases may be withdrawn from such furnace into the conduit, a bi-metallic thermo-responsive elongated helical element disposed within said conduit and co-axial therewith, one end of said element being fixedly anchored against rotation relatively to said conduit, a shaft extending axially through said element and operatively connected to the unanchored end thereof so as to be rotatable thereby, a switch actuating member carried on said shaft, means associated with said shaft for frictionally driving said actuating member, a damper carried by said shaft and rotatable therewith, said damper being disposed within said conduit and adjacent said intake port and operative upon rotation to variably constrict said port, the arrangement being such that said damper increasingly constricts said port as the temperature of said element increases, said damper being spaced away from said port so that the port remains slightly open when the damper is in its fully closed posture, and an air-intake port leading into said conduit for admitting air from the ambient atmosphere, said air-intake port being located adjacent the unanchored end of said thermo-responsive element so that the air entering the conduit therethrough traverses said element to reduce the heating effect of said hot gases thereon.

4. In combination with means defining a combustion chamber and means including a fuel pump and a blower for delivering fuel and air into the combustion chamber, of an automatic outfire control comprising a thermo-responsive element having a portion movable in response to temperature changes, a conduit surrounding said thermo-responsive element and having an intake port near one end connected with the combustion chamber, the other end of the conduit being connected to the suction side of said blower, whereby hot gases are withdrawn from the combustion chamber and brought into contact with said thermo-responsive element, a damper located within said conduit adjacent said intake port and operatively connected with said movable portion of said thermo-responsive element, whereby movement of the damper progressively constricts said port as the temperature of the thermo-responsive element increases, and an air intake port leading into said conduit adjacent to the movable portion of the thermo-responsive element to admit air into the conduit and thereby reduce the temperature of the hot gases therein.

5. In combination with means defining a combustion chamber and means including an electrically energized motor and a fuel pump and a blower operated thereby to deliver fuel and air into the combustion chamber, of an automatic outfire control comprising a thermo-responsive element having a portion movable in response to temperature changes, a conduit surrounding said element and having an intake port near one end connected with the combustion chamber, the other end of the conduit being connected to the suction side of said blower, whereby hot gases are withdrawn from the combustion chamber and brought into contact with said thermo-responsive element, a shaft operatively connected with the movable portion of said thermo-responsive element, a damper located within the conduit and operatively connected with said shaft for movement across said port to partially constrict the same and thereby reduce the volume of hot gases drawn into the conduit, a switch actuating member carried on said shaft, means associated with said shaft for frictionally driving said actuating member, and an air-intake port leading into the conduit adjacent the movable portion of said thermo-responsive element so as to admit air into the conduit to reduce the temperature of the hot gases therein.

ALICK CLARKSON.

REFERENCES CITED

The following references are of record in the file of this patent:

UNITED STATES PATENTS

| Number | Name | Date |
|---|---|---|
| Re. 16,444 | Fesler | Oct. 26, 1926 |
| 1,640,728 | Scott | Aug. 30, 1927 |
| 1,663,442 | Culp | Mar. 20, 1928 |
| 1,664,339 | Williams | Mar. 27, 1928 |
| 1,782,937 | Perry | Nov. 25, 1930 |
| 2,325,964 | Macchi | Aug. 3, 1943 |